United States Patent
Efimov et al.

(10) Patent No.: US 6,586,141 B1
(45) Date of Patent: Jul. 1, 2003

(54) PROCESS FOR PRODUCTION OF HIGH EFFICIENCY VOLUME DIFFRACTIVE ELEMENTS IN PHOTO-THERMO-REFRACTIVE GLASS

(75) Inventors: Oleg M. Efimov, Orlando, FL (US); Leonid B. Glebov, Orlando, FL (US); Vadim I. Smirnov, Orlando, FL (US); Larissa Glebova, Orlando, FL (US)

(73) Assignee: University of Central Florida, Orlando, FL (US)

( * ) Notice: Subject to any disclaimer, the term of this patent is extended or adjusted under 35 U.S.C. 154(b) by 10 days.

(21) Appl. No.: 09/648,293

(22) Filed: Aug. 24, 2000

Related U.S. Application Data (60) Provisional application No. 60/174,432, filed on Jan. 4, 2000.

(51) Int. Cl.[7] .................................................. G03H 1/04
(52) U.S. Cl. ................................ 430/1; 430/2; 430/290; 430/330; 359/3
(58) Field of Search ................................. 430/1, 2, 290, 430/330; 359/3; 65/30.11

(56) References Cited

U.S. PATENT DOCUMENTS

| | | | |
|---|---|---|---|
| 3,640,604 A | 2/1972 | Yarnell | 350/162 SF |
| 3,675,990 A | 7/1972 | Kogelnik et al. | 350/311 |
| 4,057,408 A | * 11/1977 | Pierson et al. | 65/18 |
| 4,514,053 A | 4/1985 | Borrelli et al. | 350/162.2 |
| 4,567,104 A | 1/1986 | Wu | 428/410 |
| 4,670,366 A | 6/1987 | Wu | 430/13 |
| 4,894,303 A | 1/1990 | Wu | 430/13 |
| 4,946,253 A | 8/1990 | Kostuck | 350/169 |
| 4,965,152 A | 10/1990 | Keys et al. | 430/1 |
| 5,078,771 A | 1/1992 | Wu | 65/30.11 |
| 5,196,282 A | 3/1993 | Knobbe | 430/2 |
| 5,285,517 A | 2/1994 | Wu | 385/142 |
| 5,486,934 A | 1/1996 | Huang | 359/15 |
| 5,684,611 A | 11/1997 | Rakuljic et al. | 359/7 |

OTHER PUBLICATIONS

Kuchinskii et al., "Properties of volume phase holograms on polychromatic glasses", Opt. Spektrosk. vol. 70(6) pp. 1296–1300.*
Borgman, et al., "Periodic Relief Structures on the surfaces of photo glass–ceramics", Opt. Zh. vol. 9 pp. 28–30 (1992).*
Dotsenko, et al., "Absorption spectra of multichromic glasses." Fiz. Khim. Stekla. vol. 11(5) pp. 592–595 (1985).*
Stookey, S.D., "Photosensitive glass, a new photographic medium", Ind. Eng. Chem., vol. 41(4) pp. 856–861 (1949).*
Barth, K., "Measurements on photosensitive glasses", Silikat. Tech. vol. 11(3) pp. 101–105 (1960).*
Blinov et al., "Effects of dopant treatment on the structure and physicomechanical properties of photosensitive glass–ceramics", IZv. Akad. Nauk SSSR, Neorg. Mater. vol. 20(10) pp. 1737–1740 (1984).*

(List continued on next page.)

*Primary Examiner*—Martin Angebranndt
(74) *Attorney, Agent, or Firm*—Brian S. Steinberger; Law Offices of Brian S. Steinberger, P.A.

(57) ABSTRACT

A novel process is proposed for the volume diffractive element (Bragg grating) fabrication in photosensitive silicate glasses doped with silver, cerium, fluorine, and bromine. The process employs a photo-thermo-refractive (PTR) glass of high purity exposed to ultraviolet (UV) radiation of a He—Cd laser at 325 nm followed by thermal development at temperatures from 480° C. to 580° C., preferably at 520° C., from several minutes to several hours. Absolute diffraction efficiency up to 95% was observed for 1 mm thick gratings. Maximum spatial frequency recorded in PTR glass was about of 10,000 $mm^{-1}$. No decreasing of diffraction efficiency were detected at low spatial frequencies. Original glasses were transparent (absorption coefficient less than 1 $cm^{-1}$) from 350 to 4100 nm. Induced losses in exposed and developed glass decreased from 0.3 to 0.03 $cm^{-1}$ between 400 and 700 nm, respectively, and did not exceed 0.01–0.02 $cm^{-1}$ in the infrared (IR) region from 700 to 2500 nm.

11 Claims, 6 Drawing Sheets

OTHER PUBLICATIONS

Abstract of Kuchinskii et al., "Properties of volume phase holograms on polychromatic glasses", Opt. Spektrosk. vol. 70(6) pp. 1296–1300 (1991).*

Abstract of Borgman, et al., "Periodic Relief Structures on the surfaces of photo glass–ceramics", Opt. Zh. vol. 9 pp. 28–30 (1992).*

Abstract of Dotsenko, et al., "Absorption Spectra of Multichromic Glasses", Fiz. Khim. Stekla, vol. 11(5) pp. 592–595 (1985).*

Efimov , et al. "Laser–induced Damage of Photo–Thermo–Refractive Glasses for Optical–Holographic–Element Writing", Proc. SPIE vol. 3578, pp. 564–575 (1999).*

*Optical Holography Principles, techniques and applications*, second edition, P. Hariharan, Cambridge University Press. pp 94–123.

*Full–Color Photosensitive Glass*, S. Donald Stookey, George H. Beall and Joseph E. Pierson, Journal of Applied Physics, vol. 49, No. 10, Oct. 1978, pp. 5114–5123.

*Photolytic Technique for Producing Microlenses in Photosensitive Glass*, Borelli, Morse, Bellman and Morgan, Applied Optics, vol. 24, No. 16, Aug. 15, 1985, pp. 2520–2525.

*Photothermal Refractive Effect in Silicate Glasses*, Borgman, Glebov, Nikonorov, Petrovskii, Savvin and Tsvetkov, Sov. Phys. Dokl, vol. 34, No. 11, Nov. 1989, pp. 1011–1013.

*Polychromic glasses—A New Material for Recording Volume Phase Holograms*, Glebov, Nikonorov, Panysheva, Petrovskii, Savvin, Tunimanova and Tsekhomskiir, Sov. Phys. Dokl, vol. 35, No. 10, Oct. 1990, pp. 878–880.

*New Ways to Use Photosensitive Glasses for Recording Volume Phase Holograms*, Glebov, Nikonorov, Panysheva, Petrovskii, Savvin, Tunimanova, and Tsekhomskii, Opt. Spectrosc., vol. 73, No. 2, Aug. 1992, pp. 237–241.

*Photo–Induced Processes in Photo–Thermo–Refractive Glasses*, Glebov, Glebova, Richardson and Smirnov, XVII International Congress on Glass, San Francisco, CA, Jul. 5–10, 1998.

*High–Efficiency Bragg Gratings in Photothermorefractive Glass*, Efimov, Glebov, Glebova, Richardson and Smirnov, Applied Optics, vol. 38, No. 4, Feb. 1999, pp. 619–627.

* cited by examiner

PROCESS FOR PRODUCTION OF HIGH EFFICIENCY VOLUME DIFFRACTIVE ELEMENTS IN PHOTO-THERMO-REFRACTIVE GLASS

This invention relates to holographic optical elements and in particular to a method of making volume diffractive elements (e.g. Bragg gratings) from doped photo sensitive silicate glasses using a photo-thermo-refractive (PTR) process and this application claims priority from U.S. Provisional Application Ser. No. 60/174,432 filed Jan. 4, 2000 and was funded by the Ballistic Missile Defense Organization Contract 66001-97-C60008.

BACKGROUND AND PRIOR ART

Increasing applications for holographic optical elements have resulted in continued development of new effective and reliable photosensitive media. P. Hariharan in his book pages 95 and 96 [herein after noted as Ref. 1] reports that the main photosensitive materials available for high efficiency hologram recordings are silver halide photographic emulsions, dichromated gelatin, photoresists, photopolymers, photothermoplastics, polymers with spectral hole-burning, and photorefractive crystals. Each of these materials has their merits, but all have drawbacks. These organic materials (photographic emulsions, dichromated gelatin, and photopolymers) are sensitive to humidity. Moreover, they significantly shrink in the development process. Inorganic materials (photorefractive crystals) have low resistance to elevated temperatures and produce additional patterns because of exposure to the beam diffracted from the recorded grating.

The ideal recording material for holography should have a spectral sensitivity well matched to available laser wavelengths, a linear transfer characteristic, high resolution, and low noise, be indefinitely recyclable or relatively inexpensive. Hariharan reports on page 95 of his book [Ref. 1] (see listing of references before claims section of this invention) that "While several materials have been studied, none has been found so far that meets all these requirements". The lack of available materials for phase holographs has stimulated the search for new approaches.

A photo-thermal process based on precipitation of dielectric microcrystals in the bulk of glass exposed to UV radiation was reported by Stookey [hereinafter referred to as Ref. 2] Stookey's two-step process (exposure and thermal development) was used to record a translucent image in glass because of light scattering caused by a difference between refractive indices of a precipitated crystalline phase and the glass matrix. Later, colored images were recorded in similar glasses by photo-thermal precipitation of a number of complex crystals of different compositions, sizes and shapes. According to these studies, the first step is the exposure of the glass sample to UV radiation, which produces ionization of a cerium ion. The electrons released from cerium are then trapped by a silver ion. As a result, silver is converted from a positive ion to a neutral atom. This stage corresponds to a latent image formation and no significant coloration occurs.

The next step is a thermal development. This development process includes two stages described in publications [hereinafter referred to as Ref. 3, and hereinafter referred to as Ref. 4]. The first involves the high diffusion rate silver atoms possess in silicate glasses. This diffusion leads to creation of tiny silver crystals at relatively low temperatures (450–500° C.). A number of silver clusters arise in exposed regions of glass after aging at elevated temperatures. These silver particles serve as the nucleation centers for sodium and fluorine ion precipitation and cubic sodium fluoride crystal growth occursfat temperatures between 500° C. and 550° C. Further heat treatment leads to growth of numerous elongated pyramidal complexes of (Na,Ag—F,Br) crystals on the surface of cubic NaF crystals. This mixture of crystals can produce opal coloration in the case of large crystal sizes or yellow coloration caused by colloidal silver precipitated on interfaces of dielectric crystals. A second exposure to UV followed by a second heat treatment produces different coloration because of metallic silver reduction on the surfaces of the dielectric pyramids. The final resulting coloration depends on the size and aspect ratio of these silver particles. This multi-stage photo-thermal process in photosensitive glass was proposed for decoration, color photography, sculpture, and even for holography (See [Ref. 3, Ref. 4 and Ref. 5]). However no evidences of any hologram recorded in these glasses are in those references.

Several years later, the use of inorganic photosensitive glasses for phase hologram recording rather than as a photographic medium was reported in the literature: Bragg gratings were obtained both in lithium-aluminum-silicate (Ref. [6]); and sodium-zinc-aluminum-silicate (Ref. [7] and Ref. [8]); glasses doped with silver and cerium; by exposure to UV radiation followed by thermal treatment. This phenomenon was named the "photo-thermo-refractive" (PTR) process. Glasses, which possess such properties, were called "photo-thermo-refractive" (PTR) glasses.

It was reported in Refs. [7] and [8] that a refractive index decrease of about $5 \times 10^{-4}$ occurs when dielectric crystals precipitated in glasses are exposed to radiation of a nitrogen laser at 337 nm. The refractive index of NaF in the red spectral region is $n_{NaF}=1.32$ whereas the refractive index of PTR glass $n_{PTR}=1.49$. The small value of refractive index change is due to the small volume fraction of precipitated crystalline phase; however, it is sufficient to result in high efficiency Bragg grating recording in samples with thickness more than several hundreds of microns. Conditions of glass exposure and development were found in that work to create Bragg gratings with relative diffraction efficiency up to 90% and angular selectivity up to 2 mrad. The maximum recorded spatial frequency was 2500 $mm^{-1}$. These gratings were stable up to 400° C. The photosensitivity was found in the range of several $J/cm^2$ at a nitrogen laser wavelength (337 nm). The absorption band of $Ce^{3+}$, which is used for photo-ionization, has maximum near 300 nm and a long wavelength tale up to 400 nm. This means that several commercial lasers such as $N_2$, Ar, He—Cd, etc., can be used for recording. Once developed, holograms in PTR glass were not destroyed by further exposure to visible light.

Unfortunately, these materials reported in Refs. [6–8] do not met all requirements formulated in Hariharan, particularly absolute diffraction efficiency [1, Table 7.1 at page 96] because their property of excessive (strong) scattering of the radiation imposed on the hologram. This scattering results in low absolute diffraction efficiency of gratings in PTR glasses, which has been found not to exceed 45%. Thus, this PTR material for holographic optical elements described in Refs. [6–8] had serious drawbacks; particularly, inadequate absolute diffraction efficiency which results in excessive scattering of the radiation.

SUMMARY OF THE INVENTION

The first objective of the present invention is to provide a method for preparing a holographic element having an absolute diffraction efficiency of greater than 50 percent.

The second objective of this invention is to provide a holographic element from PTR glass having an absolute diffraction efficiency of greater than 90 percent.

The third objective of this invention is to provide a holographic element from PTR glass having an absolute diffraction efficiency of at least 93 percent.

The fourth objective of this invention is to provide a procedure of photo-thermo-refractive glass fabrication which provide a high absolute diffraction efficiency of recorded Bragg gratings.

A preferred embodiment of the invention is a process comprising the steps of: fabrication of a photo-thermo-refractive (PTR) glass containing oxides of sodium, zinc, aluminum, and silicon as main components, fluorine, bromine, tin, antimony, fluorine, and bromine as dopants, and no impurities of iron and heavy metals in concentrations more than 5 parts per million, exposing said glass to patterned ultraviolet radiation in spectral region from 280 to 400 nm for dose above 50 mJ/cm$^2$, thermal development at temperatures in the range from 480 C. to 580 C. whereby the resulting Bragg grating has an absolute diffraction efficiency of at least 90%.

Further objectives and advantages of this invention will be apparent from the following detailed description of the presently preferred embodiments which are disclosed in the following text and properties of which are illustrated in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

To overcome the drawbacks of the prior art in developing useful glass holograms, it was necessary to establish if the high losses (excessive scattering) are an intrinsic feature of PTR glasses or, with proper choices of glass technology, conditions of exposure and/or thermal development, this phenomenon can be eliminated. To do this, studies were made of: PTR glass melting and samples preparation; absorption spectra of original, exposed and developed PTR glasses in the UV, visible, and IR regions; Bragg grating optical properties versus conditions of PTR glass fabrication, UV exposure and thermal treatment; and, the types of losses, which appeared in the process of hologram recording.

These numerous studies have resulted in a unique process that produces a new inorganic PTR glass as a medium for hologram recording with the properties and performance which meets the requirements indicated above. The process with its steps of first fabricating the glass, then preparing the glass blank and fabricating it into an optical hologram is hereafter set forth:

1. PTR Glass Fabrication
    1.1. Batching. Weighing and mixing components (oxides, fluorides and salts) which are necessary for glass fabrication. Components should not contain impurities of iron and heavy metals above few parts per million.
    1.2. Melting. Heating of batch in crucible at temperatures which range from 1450 to 1500° C. for several hours. Glass fabrication setup should prevent additional contamination of glass with iron and heavy metals.
    1.3. Homogenization. Stirring the glass melt for several hours to average the composition through the volume.
    1.4. Cooling. Fast cooling to temperatures about 500° C. in the crucible or by casting onto a metal slab.
    1.5. Annealing. Aging the glass at temperature of 460° C. for stress and structural relaxation followed by slow cooling to the room temperature with a cooling rate in the range of tenths or hundredths of degree per minute.
2. Blank Fabrication
    2.1. Cutting. Slicing and dicing the glass slab to parts according to the holographic element size in accordance with specification. Routine sizes of diffractive elements a ranged from few of millimeters to several centimeters in diameter and from several tenths to several millimeters in thickness.
    2.2. Grinding and polishing to secure glass element transparency in directions of writing and utilization.
3. Optical Hologram Fabrication
    3.1. Illumination setup design and fabrication for interference pattern generation at desirable wavelength with preset spatial frequency ranged up to 10000 lines/mm.
    3.2. Exposure of virgin glass blank to optical radiation in the range of glass photosensitivity (280–380 nm) for dosage ranged from 50 to 5000 mJ/cm$^2$ for wavelength of 325 nm. Optimal values of exposure are 300–600 mJ/cm$^2$.
    3.3. Thermal development. Heating of exposed glass plate at temperatures ranging from 480 to 580° C. (optimal temperature is about 520° C.) for aging from several minutes to several hours.
    3.4. Second annealing. Aging the glass at temperature of 460° C. for stress and structural relaxation followed by slow cooling to the room temperature with the cooling rate in the range of tenths or hundredths of degree per minute.

Thus the process of the invention involves the steps of: melting of the PTR glass mixture; annealing the homogenized melt; preparing glass samples of from 0.5 to 10 mm thickness having an absorption coefficient of less 1 cm$^{-1}$ for wavelengths ranging from 280 to 380 nm; irradiating said sample with a patterned beam of radiation ranging from 50 mJ/cm$^2$ to 5000 mJ/cm$^2$, and thermal developing the PTR glass at temperatures from 500° to 650° C. for a period of from a few minutes to several hours; whereby a Bragg grating having an absolute diffraction efficiency of at least 90% is realized.

The same photosensitive glass of composition (mol. %) 13.6Na$_2$O-5.2ZnO-2.3Al$_2$O$_3$-72.3SiO$_2$-3.7NaF-1.5KBr-1.3AlF$_3$-0.01Ag$_2$O-0.01CeO$_2$-0.02SnO$_2$-0.03Sb$_2$O$_3$ was studied in this work as in the previous works set forth in Ref. [7, 8]. The difference was in the use of high-purity raw materials with total contamination with iron and heavy metals below 5 parts per million and glass melting technology providing no additional contaminations. Concentrations of iron and heavy metals in raw materials are summarized in Table 1.

TABLE 1

| Component | Concentration in batch, Wt. % | Contamination Fe, ppm | Contamination heavy metals, ppm |
|---|---|---|---|
| $SiO_2$ | 69.0 | <1 | <1 |
| $Na_2CO_3$ | 11.5 | 2 | 2 |
| $NaNO_3$ | 18.4 | 1 | 3 |
| $Al_2O_3$ | 3.8 | <1 | <1 |
| ZnO | 6.7 | 5 | 5 |
| $Na_3AlF_6$ | 4.2 | 2 | <1 |
| KBr | 2.8 | <1 | <1 |

The glass was melted in an electrical furnace (DelTech model DT-31-RS-OS) in 400 ml fused silica crucibles at 1460° C. for 5 hours with stirring to homogenize the melt. After the melting, the glass was poured onto a thick metal slab or cooled in the crucible to the annealing temperature. For structural and stress relaxation, the glass casting underwent annealing at 460° C. for several hours and then cooled to the room temperature with cooling rate of 0.2°/min. Thermal development was controlled by keeping the exposed specimen in the same furnace at a preferred temperature of 520° C., although temperatures from 500° C. to 650° C. can be used, from periods of a few of minutes to several hours. Polished glass samples from 0.5 mm to 10 mm thickness of 12×25 mm size were prepared by using a Buehler Ecomet-3 grinder/polisher with an Automet-2 power head. Optical homogeneity of samples was determined by liquid-cell interferometer with accuracy of $10^{-6}$. Samples with refractive index fluctuations below $10^{-4}$ were selected for diffractive element recording.

Absorption spectra from 200 nm to 5000 nm were measured using both a double beam Perkin-Elmer 330 spectrophotometer and a single beam Perkin-Elmer 1600 FTIR spectrophotometer. To avoid uncertainty in absorption coefficient caused by dispersion of surface losses in such wide spectral area, optical densities ($D_1$ and $D_2$) for two samples of different thickness ($l_1$ and $l_2$) were measured for each glass. Absorption coefficient was calculated as $$A = \frac{D_1 - D_2}{l_1 - l_2}.$$

Absorption spectra measured by UV/VISIBLE and IR spectrophotometers were merged at 2300 nm because of the lowest glass absorption value in the spectral region of overlap between short and long wavelength spectrophotometers. Additional absorption (or more exactly, attenuation, because induced scattering can contribute in the short wavelength region) induced by exposure to UV radiation and heat treatment ($A_{ad}$) was calculated as $A_{ad}=A_{ex}-A$, where $A_{ex}$ and A are absorption coefficients of exposed and original specimens. Actually, it is necessary to take into account a distribution of induced absorption along the beam propagation in the sample caused by decreasing of exciting beam intensity. The averaged data was used, as shown above, because glass absorption at the wavelength of exposure (325 nm) is too low (~0.5 $cm^{-1}$). This caused attenuation of no more than 10% in 1 mm thick sample which were usually used for experiments, and allowed the data use for loss evaluation. Total accuracy of the absorption coefficient measurement was ±0.01 $cm^{-1}$.

Glasses were exposed to radiation of a single transverse mode, 1 mW He—Cd laser (Kimmon Electric model RM3021 R-L) at 325 nm. The laser beam passed through a telescope with variable expansion from $1^x$ to $10^x$ and a spatial filter. Exposure to a homogeneous single beam was used for the induced absorption spectra, optical microscopy, and light scattering study. An exposure to interference pattern was used to produce Bragg gratings in glass. To do this, the beam was split and then matched under different angles, which provided spatial frequencies in the glass sample from 250 $mm^{-1}$ to 10,000 $mm^{-1}$. Holographic gratings of about 5 mm×5 mm size were recorded in samples ranging in thickness up to 2 mm.

The features of recorded patterns were observed in the samples, which were polished on all sides, using an optical microscope. This approach allowed recording of patterns from different directions. A single transverse mode He—Ne laser at 633 nm was used for the study of photo-thermo-induced phenomena in PTR glass. Patterns of the scattered light of the He—Ne laser from a glass sample produced by UV exposure and thermodevelopment were recorded with a CCD camera (Sony XC-77). The dependencies of these patterns on conditions of recording (single and dual beams) and reading (different deviation from the Bragg angle) were explored. The diffraction patterns were studied for Bragg gratings recorded in PTR glasses. Intensities of incident beam ($I_L$), transmitted beam ($I_0$), and diffracted beam ($I_1$) were measured by a two-head power meter (Ophir Laser Star). The reflection coefficient ($\rho$) was calculated by the Fresnel formula $$\rho = \left(\frac{n-1}{n+1}\right)^2.$$

where n=1.49 is a refractive index of PTR glass. Relative and absolute diffraction efficiencies were calculated as:

$$\eta_R = \frac{I_1}{I_o + I_1} \qquad \text{Equ. (1)}$$

$$\eta_A = \frac{I_1}{(1-\rho)^2 I_L} \qquad \text{Equ. (2)}$$

A term responsible for reflection in the formula for the absolute diffraction efficiency (2) was used to get data connected with the losses in the recording medium because reflection losses can be easily eliminated with an antireflection coating. The relative diffraction efficiency (1) allows description the oscillating part of the induced refractive index by Kogelnik's formula:

$$\delta n = \frac{\lambda \cos\Theta \arcsin(\sqrt{\eta_R})}{\pi d}, \qquad \text{Equ. (3)}$$

where λ is a wavelength of reading beam, Θ is the Bragg angle in the medium, d is the thickness of the specimen.

Figure 1:
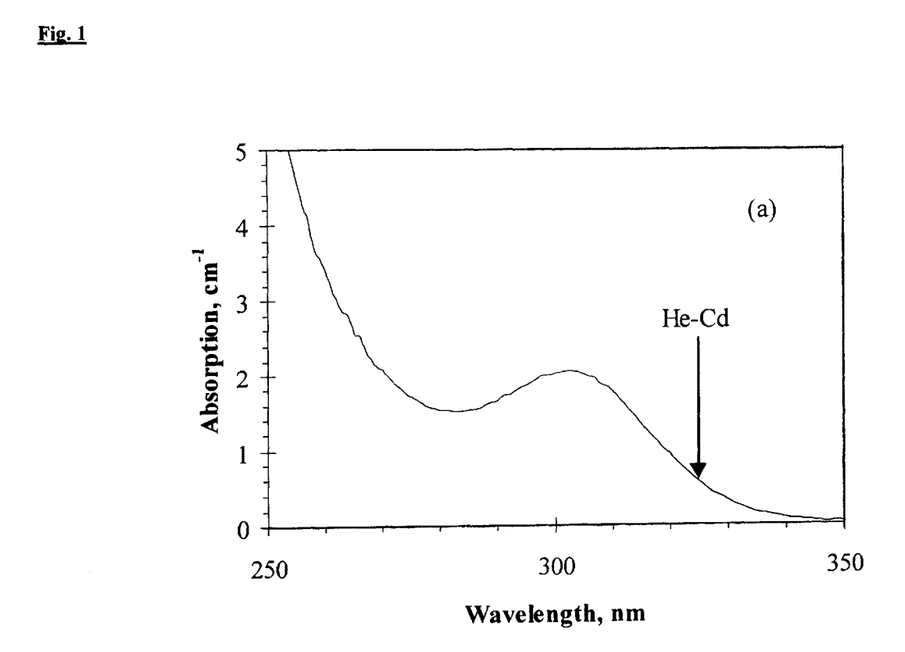
FIG. 1 shows absorption spectra of the original PTR glass in the UV spectral region.
Figure 2:
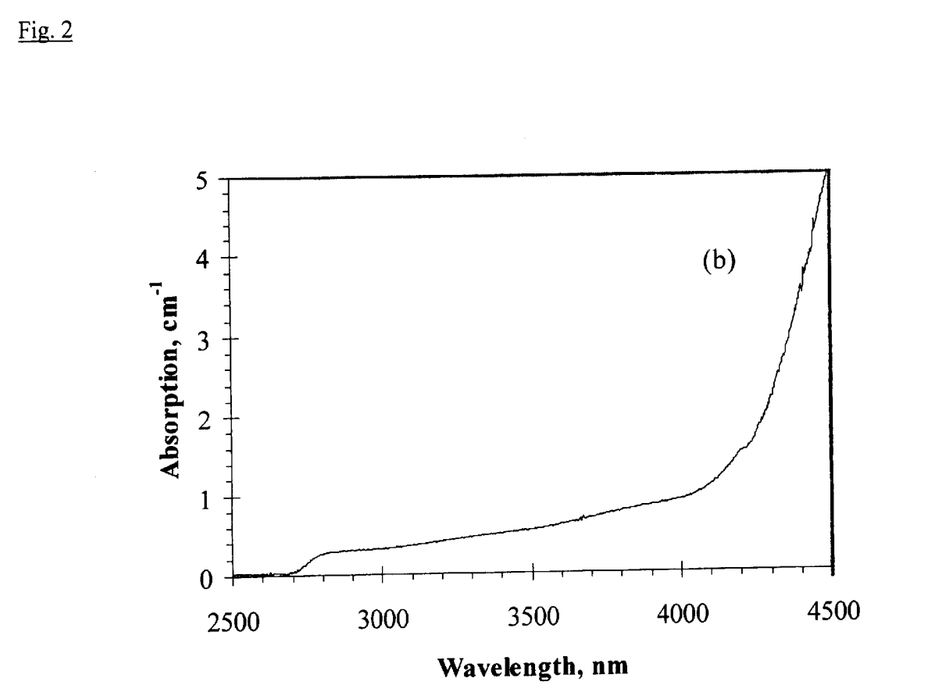
FIG. 2 shows absorption spectra of the original PTR glass in the IR spectral region.
Figure 3:
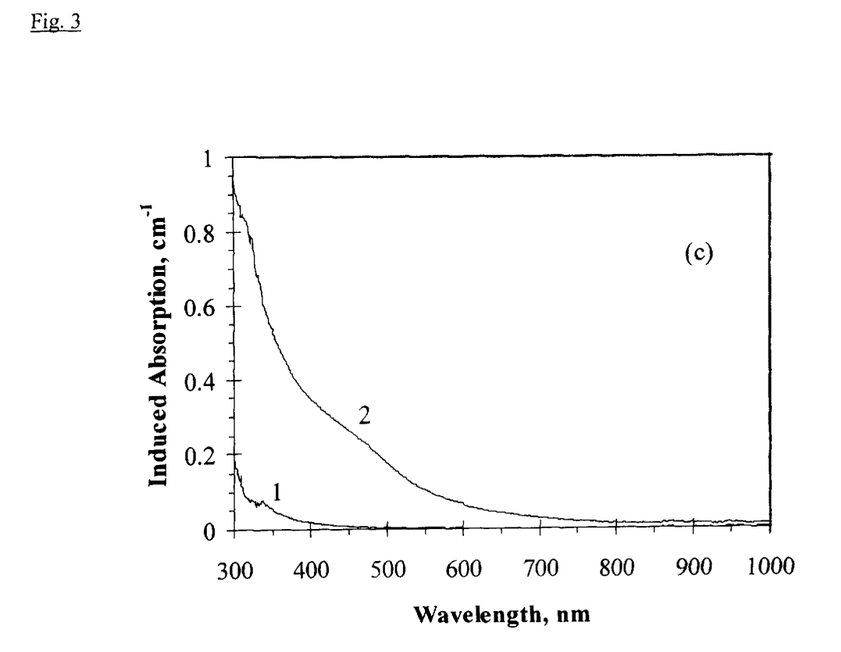
FIG. 3 illustrates induced absorption after PTR glass exposure to 325 nm for 400 mJ/cm$^2$ (curve 1) and consequent thermal development for 1 hr. at 520° C. (curve 2).

Absorption spectra of PTR glasses are presented in FIGS. 1–3. FIG. 1 shows the UV part of absorption spectrum and the arrow shows the position of the wavelength of writing He—Cd laser. One can see the wide, absorption band of $Ce^{3+}$ with maximum at 305 nm. The short wavelength absorption in the region λ<270 nm is due to a number of glass components, such as $Ce^{4+}$, $Ag^+$, $Br^-$, $Fe^{3+}$ and others. From the point of view of technical 2 application, the short wavelength edge, at which writing radiation is attenuated by two times in the recording medium (optical density about 0.3) is placed at 330 nm for a 1 cm thick plate and at 265 nm for 1 mm thick plate. The range of photosensitivity of this glass is from 280 to 380 nm.

Absorption of PTR glass is less than 0.01 $cm^{-1}$ in the visible and near IR regions and therefore, it is not shown in FIGS. 1 and 2. One can see in FIG. 2 detectable absorption at wavelengths more than 2700 nm. Absorption in this spectral region is usually ascribed to different vibrations of hydroxyl groups in the glass network and reaches several $cm^{-1}$ in silicate glasses. Hydroxyl absorption in fluorine containing PTR glass is lower when compared to similar fluorine-free silicate glass. It is believed that this phenomenon is caused by high volatilization of HF molecules, which can be produced as a result of interaction of fluorine and hydrogen in the process of glass melting. From the technical point of view, this decrease of the IR absorption in PTR glass results in an opportunity for PTR glass use in the middle IR region up to 4300 nm for 1 mm thick specimen. Hence, FIGS. 1 and 2, show that PTR glass is more transparent than usual optical crown glass and can be used in the near UV, visible and IR region up to 4000 nm.

An additional absorption of PTR glass undergoing UV exposure of 325 nm at 400 $mJ/cm^2$ used in hologram recording in this glass, is shown in FIG. 3, curve 1. Detectable photoinduced absorption is only seen in the UV region. Even at the recording wavelength this additional absorption is less 0.1 $cm^{-1}$ and cannot impact the recording process significantly. The small tail of the induced absorption spectrum in the blue region can be distinguished by the naked eyes as a slight yellow coloration of the exposed area. Thermodevelopment causes colloidal silver and sodium fluoride precipitation in the glass matrix. Fluoride crystals are colorless and can result in scattering if the size of crystals is too large (more than 100 nm). A shoulder near 450 nm in the additional absorption spectrum after thermal treatment for one hour at 520° in FIG. 3 (curve 2) was ascribed to silver particles in glass matrix. One can see that the visible additional absorption does not exceed 0.3 $cm^{-1}$ and 0.03 $cm^{-1}$ in the blue and red regions, respectively. This means that losses in this region do not exceed a few percents for a 1 mm thick plate. Additional absorption in the whole IR region is not detectable and therefore is not shown in FIG. 3. Consequently, this glass can be successfully used at all important for lasers and optical communication wavelengths in the visible and near IR regions. It was earlier found as reported in found in Refs. 7 and 8 that absorption and scattering losses in specimens sufficiently exposed for high diffraction efficiency of Bragg gratings have exceeded 50%. The conditions of exposure and thermal development for PTR glasses taught herein results in additional absorption of hundredths of $cm^{-1}$ (FIG. 1c). This corresponds to almost 100% relative diffraction efficiency at 633 nm in 1.5 mm thick sample and more than 90% absolute diffraction efficiency.

Figure 4:
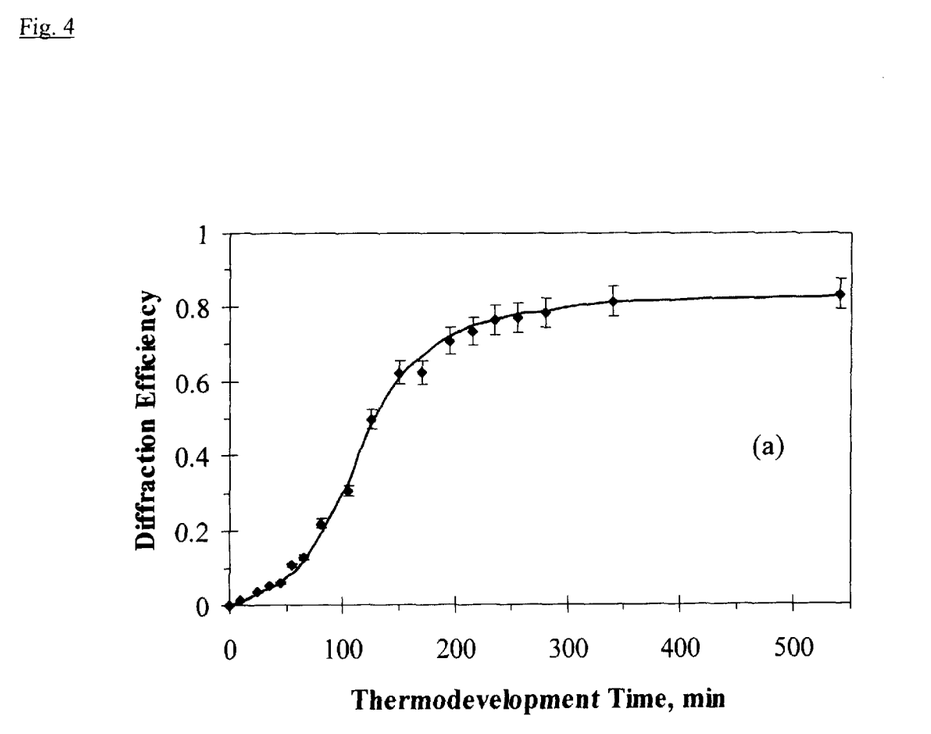
FIG. 4 shows the change in absolute diffraction efficiency over a period of thermal treatment on PTR glass.

Diffraction efficiency of Bragg gratings recorded in PTR glasses was studied as a function of conditions of writing (exposure and spatial frequency of interference pattern) and development (period). The example of the dependence of absolute diffraction efficiency on thermal treatment period is shown in FIG. 4, for one of the PTR specimens. The specimen of 1.42 mm thickness was exposed to 400 $mJ/cm^2$ at 325 nm and spacial frequency of 600 $mm^{-1}$ and underwent consecutive thermal treatments for 10–15 minutes each at 520° C., and in intervals between, was cooled down to room temperature for diffraction efficiency measurements.

The absolute diffraction efficiency was calculated with equation (2). Dependence of diffraction efficiency versus development time has an inflection point at the beginning of the process and is saturated at the level of 85% after long heat treatment times. It should be noted that this multiple heat treatment is not the same as a regular development for one or several hours because this procedure includes multiple heating and cooling. However the curve in FIG. 4 shows a tendency of diffraction efficiency to approach a high value after some exposure at elevated temperature. Diffraction efficiency growth at increasing period of thermal development is obviously caused by refractive index changes as a result of crystalline phase precipitation. Refractive index change up to $10^{-3}$ was recorded both by interferometric measurement of exposed area and by calculations based on diffraction efficiency measurements. This value means that a number of high efficiency Brag gratings can be recorded in the same volume of PTR glass.

Figure 5:
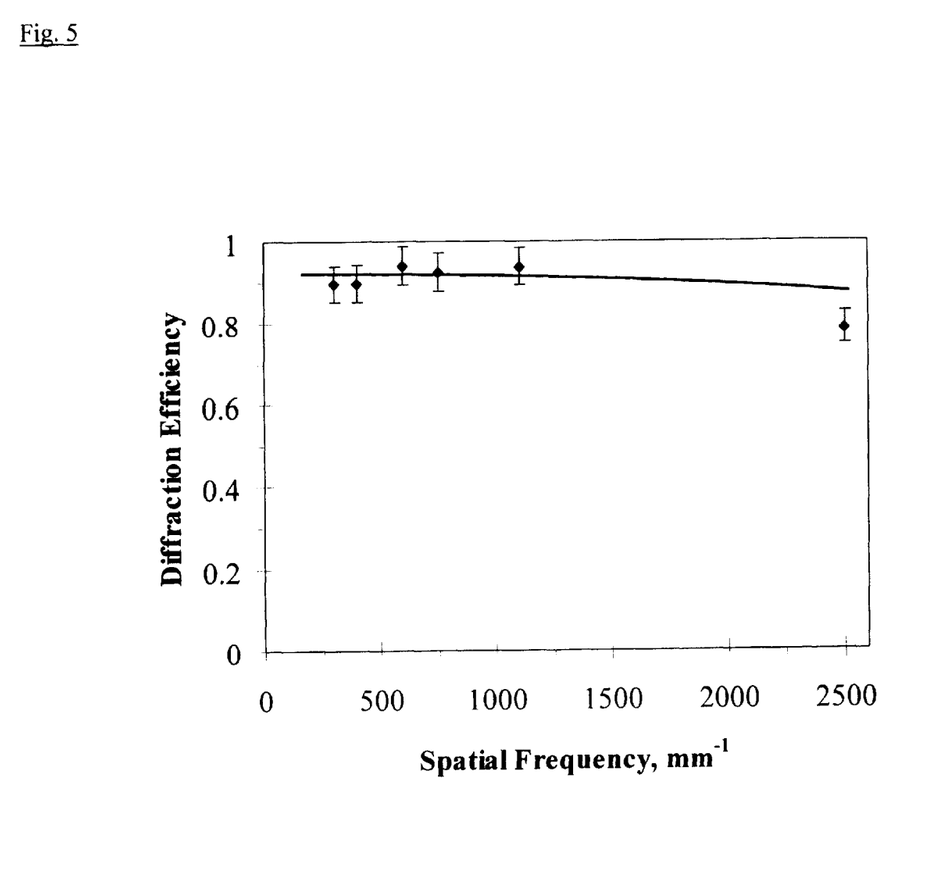
FIG. 5 shows the dependence of absolute diffraction efficiency on spatial frequency of grating.

The effect of spatial frequency of interference pattern on diffraction efficiency of grating in PTR glasses is shown in FIG. 5. This measurement was done in thin sample of 1.65 mm in a transmittance configuration when writing (325 nm) and reading (633 nm) beams were directed from the same side of glass plate. This configuration allows spatial frequency variations below 2500 $mm^{-1}$. No optimization was made for exposure or development of gratings with different spatial frequencies but exposure of 600 $mJ/cm^2$ with a development time of 90 minutes at 520° C. was applied. No significant dependence of diffraction efficiency on spatial frequency can be observed in the region from 300 mm to 2500 $mm^{-1}$ in FIG. 5. The absence of a drop in frequency response at low frequencies is a feature of the PTR process, which requires transport of species in glass matrix to build the single crystals (at distances of tens of nanometers) and does not require transport of species between exposed and unexposed areas. The lack of drop in the amplitude-frequency response at low frequencies (FIG. 5) is an advantage of PTR glasses in comparison to photo-refractive crystals, which results in a distinct opportunity to design holographic optical elements with very small diffraction angles. To find out the ultimate spatial frequency of PTR glass, the samples were exposed to an interference pattern produced by interaction of counter-propagating beams to record Bragg mirror. The frequency of interference pattern was maximal in this case and equaled to 9200 $mm^{-1}$. To realize this scheme, the laser beam was directed to the mirror placed at a small angle with respect to the incident radiation (~1°). The sample was placed in the area of incident and reflected beams overlapping in front of the mirror in the same mount to decrease the influence of vibrations during recording. Tilting of the mirror on the small angle did not change the interference pattern frequency significantly but allow complete separation of diffracted and incident beams. The sample was tilted at the angle of about 2.5° to the incident beam to exclude the influence of reflected and multiple reflected beams on the result of measurement. Mount with sample and mirror was located at the possible shortest distance from a spatial filter and all setup starting from laser output was placed in a box to decrease the influence of the air turbulence. A number of spots with exposure ranging from 0.3 to 40 $J/cm^2$ were irradiated by the interference pattern in this arrangement. The samples were developed in the furnace at 520° C. for different time intervals ranging from 0.5 to 2 hours. A reconstruction of all gratings was performed in the same arrangement but no mirror was placed. It was found that Bragg gratings were recorded in each irradiated spot.

It was found that the maximal absolute diffraction efficiency at 325 nm was observed for bigger exposure than it was for low spatial frequencies Bragg gratings. The optimal exposure for Bragg mirror was from 1.5 to 2.5 J/cm². The highest absolute diffraction efficiency reached 12.6% after two hours of thermal development at 520° C. To the best of our knowledge, this value is the highest for reflective Bragg grating for this region of spectrum. The high frequency of recorded phase grating shows that the sizes of crystals securing a change of refractive index have to be significantly less then a period of grating, i.e. they have the size no more then a few tens of nanometers. The data shown above allows application of Bragg gratings in PTR glasses both in transmitting and reflecting modes for IR, visible and UV spectral regions from 4000 nm to 300 nm.

Figure 6:
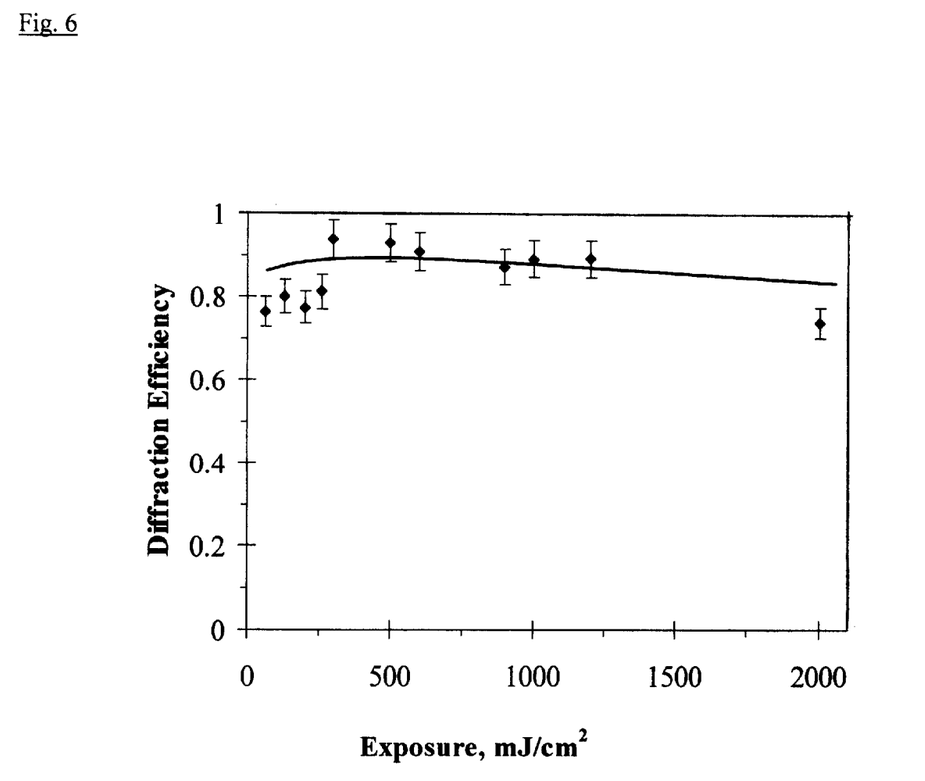
FIG. 6 illustrates the maximum absolute diffraction efficiencies of Bragg gratings in PTR glasses which have undergone different exposures to radiation of He—Cd laser at 325 nm.

An interesting consequence of the low level of induced losses (FIG. 1c, curve 2) is the rather low sensitivity of PTR-grating diffraction efficiency on exposure because underexposure can be compensated by over development and vice versa. FIG. 6 illustrates this feature of PTR glass. In this figure, the best diffraction efficiencies for specimens of different thickness from different melts, which underwent different development procedures, are plotted versus exposure to radiation of He—Cd laser. High absolute diffraction efficiency of 80% and more is observed in FIG. 6 for exposures ranging between 50 mJ/cm² and 5 J/cm². Finally, PTR glasses exhibit photosensitivity comparable with the best organic and inorganic materials and allow wide variations of exposure because of image amplification in the process of thermal development.

Further illustrative of the breath of the process of the invention are the following three examples providing optical holograms having absolute diffraction efficiencies greater than 90% (Table 2). The preparation of the several holograms was as earlier carried out with a 520° C. temperature of thermal development for periods as defined below on three virgin glass samples of differing thickness with different defined grating frequencies, dosages and reconstructing wavelengths.

of the invention is not intended to be, nor should it be deemed to be, limited thereby and such other modifications or embodiments as may be suggested by the teachings herein are particularly reserved especially as they fall within the breadth and scope of the claims here appended.

REFERENCES

1. P. Hariharan. Optical Holography, Principles, Techniques, and Applications." Chapter 7 pp. 95–124 (Cambridge University Press, 1996) [hereinafter noted as [Ref.1]]
2. S. D. Stookey. Photosensitive glass, (a new photographic medium). Industrial and Engineering Chem., 41, 856–861 (1949). [hereinafter noted as [Ref.2]]
3. S. D. Stookey, G. H. Beall, J. E. Pierson. Full-color photosensitive glass. J. Appl. Phys., 49 (1978) 5114–5123. [hereinafter noted as [Ref.3]]
4. N. F. Borrelli, J. B. Chodak, D. A. Nolan, T. P. Seward. Interpretation of induced color in polychromatic glasses. J. Opt. Soc. Amer.,69 (1979) 1514–1519. [hereinafter noted as [Ref.4]]
5. N. F. Borrelli, D. L. Morse, P A. Sachenik. Integral photosensitive optical device and method. U.S. Pat. No. 4,514,053 Apr. 30 1985. [hereinafter noted as [Ref.5]]
6. V. A. Borgman, L. B. Glebov, N. V. Nikonorov, G. T. Petrovskii, V. V. Savvin, A. D. Tsvetkov "Photo-thermal refractive effect in silicate glasses." Sov. Phys. Dokl., 34, 1011–1013 (1989). [hereinafter noted as [Ref.6]]
7. L. B. Glebov, N. V. Nikonorov, E.I. Panysheva, G. T. Petrovskii, V. V. Savvin, I. V. Tunianova, V. A. Tsekhomskii "Polychromatic glasses—a new material for recording volume phase holograms" Sov. Phys. Dokl., 35, 878–880 (1990).
8. L. B. Glebov, N. V. Nikonorov, E. I. Panysheva, G. T. Petrovskii, V. V. Savvin, I. V. Tunimanova, V. A. Teskhomskii "New ways to use photosensitive glasses for recording volume phase holograms." Opt. Spectrosc., 73, 237–241 (1992).

We claim:

1. A method of forming diffractive optical elements, comprising the steps of:

TABLE 2

| Thickness of sample, mm | Grating spatial frequency, mm$^{-1}$ | Recording wavelength, nm | Reconstructing wavelength, nm | Exposure, J/cm² | Time of thermal development, min | Diffraction efficiency, % |
|---|---|---|---|---|---|---|
| 1.65 | 400 | 325 | 633 | 1.1 | 90 | 93.8 |
| 1.95 | 300 | 325 | 633 | 0.3 | 100 | 93.9 |
| 0.72 | 300 | 325 | 1064 | 0.3 | 300 | 93.3 |

The durability of holograms in PTR glasses is remarkable for it was found that secondary heat treatment up to 400° C. does not reduce diffraction efficiency. The developed holograms were exposed to radiation of 20 mW He—Ne laser at 633 nm and 1 mW He—Cd laser at 325 nm for 5–8 hours without any hologram destruction.

The holographic optical elements that can be prepared by the Bragg grating have a diffraction efficiency of at least 90% are numerous and include but are not limited to attenuators, beam splitters, mirrors, equalizers, spectral filters, angular filters and modulators. A further advantage of the holographic optical elements of the inventive process is that the cost of this photosensitive silicate glass is rather small in comparison with other photosensitive materials.

While the invention has been described, disclosed, illustrated and shown in various terms of certain embodiments or modifications which it has presumed in practice, the scope (a) making a photo-thermo-refractive (PTR) glass which shows a refractive index increment after exposure to optical radiation followed by thermal treatment, having a substantial low level of impurities of iron and heavy metals of less than approximately 5 ppm;

(b) exposing the PTR glass to radiation in the spectral region of its photosensitivity of ultraviolet radiation ranging from approximately 280 to approximately 380 nm; and (c) thermal treating of the PTR glass in the temperature region ranging from approximately 480 to approximately 580° C. for a period of from a few minutes to several hours appropriate for phase transformation of exposed area to increase absolute diffraction efficiency of the PTR glass to at least 95% from steps (a), (b), (c), whereby holographic optical elements are formed.

2. The method of forming the diffractive optical elements of claim 1, wherein the PTR glass includes:

oxides of sodium, zinc, aluminum, and silicon as main components; and cerium, silver, tin, antimony, fluorine, and bromine as dopants.

3. The method of forming the diffractive optical elements of claim 2, wherein the PTR glass includes (mol. %): $13.6Na_2O-5.2ZnO-2.3Al_2O_3-72.3SiO_2-3.7NaF-1.5KBr-1.2AlF_3$ doped with $0.01Ag_2O-0.01CeO_2-0.01SnO_2-0.03Sb_2O_3$.

4. The method of forming the diffractive optical elements of claim 1, wherein the PTR glass includes (mol. %): $13.6Na_2O-5.2ZnO-2.3Al_2O_3-72.3\ SiO_2-3.7NaF-1.5KBr-1.2AlF_3$ doped with $0.001Ag_2O-0.001CeO_2-0.001SnO_2-0.03Sb_2O_3$.

5. The method of forming the diffractive optical elements of claims 1, 2 or 4 wherein the PTR glass is exposed using exposures ranging from approximately 50 to approximately 5000 mJ/cm².

6. The method of forming the diffractive optical elements of claims 1, 2 or 4 wherein the PTR glass is exposed using exposures ranging from approximately 300 to approximately 600 mJ/cm².

7. The method of forming the diffractive optical elements of claims 2 or 4 wherein the temperature region appropriate for phase transformation of exposed area of PTR glass includes approximately 520° C. for a period of from approximately a few minutes to approximately several hours.

8. The method of forming the diffractive optical elements of claims 2 or 4 wherein said exposed and thermally treated glass is aged at approximately 460° C. (the glass transition temperature) for stress and structural relaxation followed by slow cooling to room temperature.

9. The method of forming the diffractive optical elements of claim 1, wherein said exposed and thermally treated glass is aged at the glass transition temperature for stress and structural relaxation followed by slow cooling to room temperature.

10. A method of forming diffractive optical elements, comprising the steps of:
(a) making a photo-thermo-refractive (PTR) glass which shows a refractive index increment after exposure to optical radiation followed by thermal treatment, having a level of less than approximately 5 ppm of impurities of iron and heavy metals, wherein the PTR glass includes: oxides of sodium, zinc, aluminum, and silicon as main components; and cerium, silver, tin, antimony, fluorine, and bromine as dopants;
(b) exposing the PTR glass to radiation in the spectral region of its photosensitivity of ultraviolet radiation ranging from approximately 280 to approximately 380 nm; and
(c) increasing absolute diffraction efficiency of the PTR glass to at least 95% by thermal treating of the PTR glass in the temperature region ranging from approximately 480 to approximately 580° C. for a period of from a few minutes to several hours appropriate for phase transformation of exposed area from steps (a), (b), (c), whereby holographic optical elements are formed.

11. A method of forming diffractive optical elements, comprising the steps of:
(a) making a photo-thermo-refractive (PTR) glass which shows a refractive index increment after exposure to optical radiation followed by thermal treatment, having a level of less than approximately 5 ppm of impurities of iron and heavy metals, wherein the PTR glass includes (mol. %): $13.6Na_2O-5.2ZnO-2.3Al_2O_3-72.3SiO_2-3.7NaF-1.5KBr-1.2AlF_3$ doped with $0.01Ag_2O-0.01CeO_2-0.01\ SnO_2-0.03\ Sb_2O_3$;
(b) exposing the PTR glass to radiation in the spectral region of its photosensitivity of ultraviolet radiation ranging from approximately 280 to approximately 380 nm; and
(c) increasing absolute diffraction efficiency of the PTR glass to at least 95% by thermal treating of the PTR glass in the temperature region ranging from approximately 480 to approximately 580° C. for a period of from a few minutes to several hours appropriate for phase transformation of exposed area from steps (a), (b), (c), whereby holographic optical elements are formed.

* * * * *